United States Patent
Katzer et al.

(10) Patent No.: US 7,624,376 B1
(45) Date of Patent: Nov. 24, 2009

(54) INTEGRATION OF COTS SOFTWARE DATA STORES INTO INTEGRATED DATA ACCESS LAYER

(75) Inventors: Robin D. Katzer, Olathe, KS (US); Wing K. Lee, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 947 days.

(21) Appl. No.: 10/820,539

(22) Filed: Apr. 8, 2004

(51) Int. Cl.
*G06F 9/44* (2006.01)
*G06F 9/45* (2006.01)
*G06F 7/00* (2006.01)
*G06F 12/00* (2006.01)
*G06F 3/00* (2006.01)

(52) U.S. Cl. ............... 717/121; 717/135; 717/137; 707/2; 707/10; 707/203; 719/321; 719/329

(58) Field of Classification Search ............... None
See application file for complete search history.

(56) References Cited

U.S. PATENT DOCUMENTS

| | | | |
|---|---|---|---|
| 5,790,789 | A | 8/1998 | Suarez |
| 6,067,548 | A | 5/2000 | Cheng |
| 6,502,088 | B1 * | 12/2002 | Gajda et al. .................. 707/2 |
| 6,529,909 | B1 * | 3/2003 | Bowman-Amuah .......... 707/10 |
| 6,643,652 | B2 * | 11/2003 | Helgeson et al. ............. 707/10 |
| 6,742,015 | B1 | 5/2004 | Bowman-Amuah |
| 6,850,893 | B2 | 2/2005 | Lipkin et al. |
| 6,862,500 | B2 * | 3/2005 | Tzamaloukas ................. 701/1 |
| 6,925,378 | B2 * | 8/2005 | Tzamaloukas .............. 701/200 |
| 6,985,912 | B2 * | 1/2006 | Mullins et al. ............ 707/103 R |
| 7,149,730 | B2 * | 12/2006 | Mullins et al. ................. 707/2 |
| 7,165,239 | B2 | 1/2007 | Hejlsberg et al. |
| 7,206,805 | B1 * | 4/2007 | McLaughlin, Jr. .......... 709/203 |
| 2003/0050972 | A1 * | 3/2003 | Felt et al. .................... 709/203 |
| 2004/0008678 | A1 * | 1/2004 | Matthews et al. ........... 370/389 |
| 2004/0068479 | A1 * | 4/2004 | Wolfson et al. ................. 707/1 |
| 2005/0015619 | A1 | 1/2005 | Lee |

(Continued)

OTHER PUBLICATIONS

Lee, Wing, K., et al., Patent Application entitled, "Architecture and Method for Real-Time Asynchronous Data Warehousing with Transactional Integrity," filed Apr. 8, 2004, U.S. Appl. No. 10/820,619.

(Continued)

*Primary Examiner*—Tuan Q Dam
*Assistant Examiner*—Isaac T Tecklu (57) ABSTRACT

A system for integration of commercial-off-the-shelf software applications and databases is provided. The system includes a commercial-off-the-shelf software application operable with a first data store and providing an output compatible with the first data store. The system includes a translator, a second data store, a service broker and a data access layer. The translator is operable to receive the commercial-off-the-shelf software application output and to translate the output to a format compatible with a second or other data store, such as newer version data stores or different vendor data stores. The second data store is operable to receive and store the translated output. The service broker is operable to maintain a record of transactions output from the commercial-off-the-shelf software application and to maintain a record of transactions stored in the second data store. The storage broker is further operable to roll-back failed transactions in the second data store.

20 Claims, 4 Drawing Sheets

U.S. PATENT DOCUMENTS

2005/0192962 A1* 9/2005 Furrer et al. .................. 707/8

OTHER PUBLICATIONS

Office Action dated Jun. 20, 2006 (8 pages), U.S. Appl. No. 10/619,296, filed Jul. 14, 2003.
Final Office Action dated Dec. 1, 2006 (8 pages), U.S. Appl. No. 10/619,296, filed Jul. 14, 2003.
Office Action dated Jul. 6, 2007 (15 pages), U.S. Appl. No. 10/619,296, filed Jul. 14, 2003.
Final Office Action dated Dec. 31, 2006, (15 pages), U.S. Appl. No. 10/619,296, filed Jul. 14, 2003.
Office Action dated Jun. 24, 2008 (15 pages), U.S. Appl. No. 10/619,296, filed Jul. 14, 2003.
Final Office Action dated Jan. 16, 2009 (14 pages), U.S. Appl. No. 10/619,296, filed Jul. 14, 2003.

* cited by examiner

INTEGRATION OF COTS SOFTWARE DATA STORES INTO INTEGRATED DATA ACCESS LAYER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transfer of data between computing applications and computer-based data storage mechanisms. More particularly, embodiments of the present invention allow commercial, off-the-shelf applications to communicate with data stores different from the data stores for which the applications were originally certified.

BACKGROUND OF THE INVENTION

Commercial, off-the-shelf (COTS) computing applications sometimes need to communicate with computer-based data storage systems, protocols, and applications such as relational databases, directories, and spreadsheets. Such data storage mechanisms can be referred to as data stores. The communication between the COTS applications and the data stores can include the retrieval of data from a data store by an application and the creation, deletion, or updating of data in a data store by an application. These communication operations to and from COTS applications and data stores can be referred to generically as data requests.

COTS applications typically contain driver modules that act as interfaces between the applications and other entities. Similarly, data stores typically contain driver modules known as listeners that receive communications from applications. In order for a COTS application to communicate with a data store, a specific application driver is typically required to interface with a specific data store listener. That is, vendors of COTS applications generally certify an application and its built-in driver for use only with a particular version of a particular data store.

If a data store is replaced by a more recent version, a COTS application that had been in communication with the older version may not communicate properly with the newer version. The manufacturer of such an application may not certify it for use with the newer data store version and may cease to support its product in such a situation. Thus, replacement of a data store may necessitate the purchase of an updated version of a COTS application that is able to communicate with the new data store.

Also, when multi-step data transfer transactions take place among computing systems, errors can occur at any step in a transaction. When an error does occur in a step, it is often desirable to reverse any data changes that were made in that step and in previous steps. A two-phase commit process is sometimes followed to allow such rollbacks of data. With a two-phase commit, a copy of a data element that is to be modified by a transaction is retained temporarily. If all of the steps in a transaction are completed successfully, the copy can be discarded. If an error occurs in a step, the copy of the data element as it appeared before the transaction can be used to return the element to its previous state.

Many commercial, off-the-shelf (COTS) data stores do not have internal mechanisms that provide for transaction processing via two-phase commits or similar processes. That is, there is typically no automated method for rolling back a change that has been made to the data in a COTS data store. As used herein, the term "data store" can refer to various computer-based storage systems, protocols, and applications such as relational databases, directories, and spreadsheets.

SUMMARY OF THE INVENTION

In one embodiment, the present disclosure provides a system for decoupling commercial-off-the-shelf software applications from data stores. The system includes a plurality of commercial-off-the-shelf software applications each operable with one of a plurality of data stores. Each of the plurality of commercial-off-the-shelf software applications provide output compatible with one of the plurality of data stores. The system also includes a plurality of new generation data stores, and a translator in communication with the plurality of commercial-off-the-shelf software applications and the plurality of new generation data stores. The translator is operable to translate the output from the at least one of the of commercial-off-the-shelf software applications for storage by one of the plurality of newer generation data stores.

The present invention also provides a system for integration of commercial-off-the-shelf software applications and databases. The system includes a commercial-off-the-shelf software application operable with a first data store and providing an output compatible with the first data store. The system includes a translator, a second data store, a service broker and a data access layer. The translator is operable to receive the commercial-off-the-shelf software application output and to translate the output to a format compatible with a second or other data store, such as newer version data stores or different vendor data stores. The second data store is operable to receive and store the translated output. The service broker is operable to maintain a record of transactions output from the commercial-off-the-shelf software application and to maintain a record of transactions stored in the second data store. The storage broker is further operable to roll-back failed transactions in the second data store.

In one embodiment, the present disclosure provides a system for maintaining compatibility of commercial-off-the-shelf software applications with data stores. The system includes a commercial-off-the-shelf software application operable with only a first data store. The commercial-off-the-shelf software application providing an output compatible with only the first data store. The system also includes a listener, a translator, a data access layer, a wrapper, and a second data store. The listener is operable to receive the output from the commercial-off-the-shelf software application, and the translator communicates with the listener to receive the output and also to translate the output. The data access layer communicates with the translator and is operable to determine, based on an enterprise data model, where to direct the output of the commercial-off-the-shelf software applications. The wrapper is operable to receive the translated output from the data access layer and to wrap the translated output based on a storage format. The second data store is based on the storage format and is operable to receive and store the wrapped and translated output.

DETAILED DESCRIPTION OF THE PREFERRED EMBODIMENTS

Figure 1:
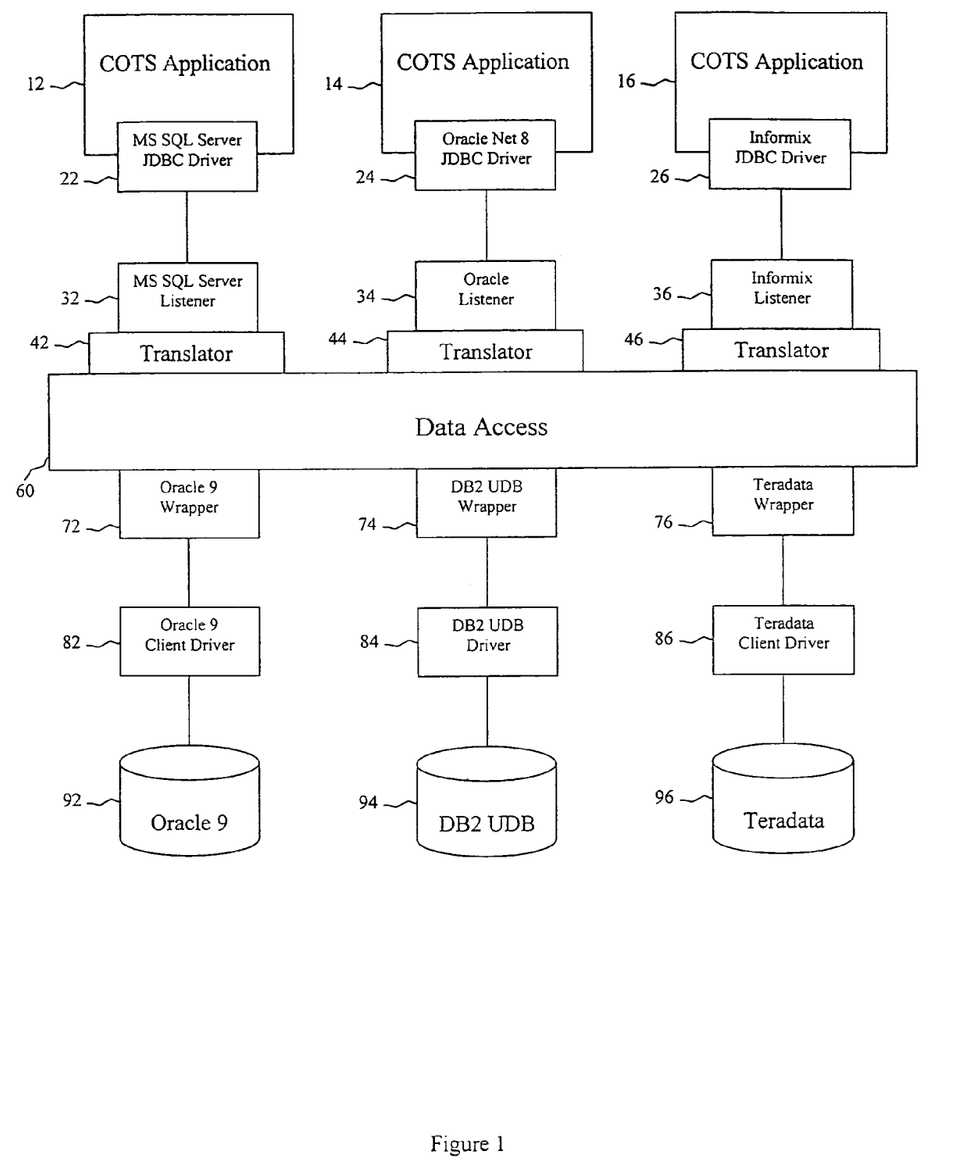
FIG. 1 is a block diagram of an embodiment of a system allowing communication between commercial, off-the-shelf applications and data stores.

FIG. 1 depicts an embodiment of a system through which commercial, off-the-shelf (COTS) computing applications can communicate with a consolidated data farm of up-to-date data stores. Any of the COTS applications can communicate with any of the data stores regardless of the version of a COTS application or data store. The COTS applications can connect to the data farm using the drivers they normally use and do not need to be aware of which data store a data request is sent to. The data stores can be upgraded as needed without the need for any changes in the COTS applications, thus effectively decoupling the COTS applications from the data stores.

Three COTS applications 12, 14, and 16 are shown in FIG. 1, each with its own driver 22, 24, and 26, respectively. The driver for COTS application 12 is a Microsoft SQL Server JDBC driver 22, the driver for COTS application 14 is an Oracle Net 8 JDBC driver 24, and the driver for COTS application 16 is an Informix JDBC driver 26. In other embodiments, other numbers of COTS applications and other types of corresponding drivers could be present.

Each driver 22, 24, and 26 communicates with a corresponding listener 32, 34, and 36. The listeners 32, 34, and 36 simulate the functions of the listeners that are typically built in to commercially available data stores. More specifically, each listener 32, 34, or 36 simulates the listener of the data store for which its corresponding COTS application 12, 14, or 16 was certified. Thus, a COTS application 12, 14, or 16 can submit a data request in its normal manner and, from its perspective, the data request is received by the same listener that normally receives its data requests.

Each listener 32, 34, or 36 communicates with a corresponding translator 42, 44, or 46. The translators 42, 44, and 46 translate data requests between the formats of the listeners 32, 34, and 36 and a single or generic format. The translators 42, 44, and 46 transfer the generic format data requests to and from a single data access layer 60.

On the opposite side of the data access layer 60 is a data farm consisting of the data stores 92, 94, and 96. The data stores shown in FIG. 1 are an Oracle 9 database 92, a DB2 database 94, and a Teradata database 96 but other numbers and types of data stores could be present. Each data store 92, 94, and 96 has a corresponding wrapper and driver that are typically supplied by the data store manufacturers. That is, the Oracle 9 database 92 has an Oracle 9 driver 82 and an Oracle 9 wrapper 72, the DB2 database 94 has a DB2 driver 84 and a DB2 wrapper 74, and the Teradata database 96 has a Teradata driver 86 and a Teradata wrapper 76. The drivers 82, 84, and 86 act as listeners to receive data requests from other entities. The wrappers 72, 74, and 76 contain the connection properties that specify which driver 82, 84, or 86 is to receive a data request.

The data access layer 60 handles data transfers between the translators 42, 44, and 46 and the wrappers 72, 74, and 76. The data access layer 60 receives data requests from the translators 42, 44, and 46 in the single or generic format into which all, or perhaps only some groups, of the translators 42, 44, and 46 have the capability of converting data requests. This single or generic format may be, for example, a language or data format or standard compatible with the all, or groups, of the translators 42, 44, and 46. Upon receiving a data request, the data access layer 60 determines which data store 92, 94, or 96 the data request should be sent to. The data access layer 60 then translates the data request from the generic format into the format of the appropriate data store 92, 94, or 96. The data access layer 60 then sends the data request to the wrapper 72, 74, or 76 for the appropriate data store 92, 94, or 96.

A model of an enterprise's data describing the relationships among the data can be stored in the data access layer 60. This model can allow the data access layer 60 to determine the data store 92, 94, or 96 to which a data request should be sent and the format into which the request should be translated. An example of a data access layer 60 is the DB2 Information Integrator provided by IBM.

Upon receiving a data request, a wrapper 72, 74, or 76 sends the request to its corresponding driver 82, 84, or 86, which then passes the request on to its corresponding data store 92, 94, or 96. The data store 92, 94, or 96 then performs the action specified in the data request. In the case of a request for the retrieval of a data element from a data store 92, 94, or 96, the requested data element is returned to the requesting COTS application 12, 14, or 16 along a path that is the reverse of that described above. In the case of the creation, deletion, or updating of a data element in a data store 92, 94, or 96, a confirmation of the successful completion of the request might be sent along the reverse path.

The components shown in FIG. 1 are arranged in straight lines from COTS application 12 to data store 92, from COTS application 14 to data store 94, and from COTS application 16 to data store 96. This might give the impression that COTS application 12 can communicate only with data store 92, COTS application 14 can communicate only with data store 94, and COTS application 16 can communicate only with data store 96. However, this is not the case. The data access layer 60 can translate data requests from the generic language provided by the translators 42, 44, and 46 into the native language of each data store 92, 94, and 96. Therefore, the data access layer 60 can actually receive a data request from any COTS application 12, 14, or 16 and send the request to any data store 92, 94, or 96.

As an example, COTS application 12 might submit a data request to retrieve a particular data element from the data farm consisting of data stores 92, 94, and 96. The requested data element could reside in any of the data stores 92, 94, or 96 but COTS application 12 need not be aware of which data store 92, 94, or 96 the data element resides in. The driver 22 on COTS application 12 merely submits the request in its normal manner. In this case, the driver 22 is a Microsoft SQL Server JDBC driver, so the driver 22 submits the request in the form of an SQL statement.

The SQL statement is received by the MS SQL Server listener 32. The MS SQL Server listener 32 simulates the functions of the listener on the data store for which the COTS application 12 has been certified. This gives the COTS application 12 the impression that it is submitting the SQL statement to the data store for which it has been certified. In this way, the COTS application 12 is decoupled from the data stores 92, 94, and 96 in the sense that the COTS application 12 functions in the same manner regardless of the characteristics of the data stores 92, 94, and 96.

The MS SQL Server listener 32 sends the SQL statement to the translator 42. The translator 42 receives the SQL statement from the MS SQL Server listener 32 and translates it into a generic format readable by the data access layer 60. The translator 42 then sends the generically formatted data request to the data access layer 60.

Upon receiving the data request, the data access layer 60 determines the data store 92, 94, or 96 to which the data request should be sent. The data access layer 60 then translates the data request from the generic format into the native format of the appropriate data store 92, 94, or 96. The data access layer 60 then sends the data request to the wrapper 72, 74, or 76 associated with the appropriate data store 92, 94, or 96.

The wrapper 72, 74, or 76 receiving the data request contains connection properties that allow the data request to be sent to the appropriate driver 82, 84, or 86. Upon a wrapper 72, 74, or 76 sending the data request to a driver 82, 84, or 86 and the driver 82, 84, or 86 receiving the data request, the driver 82, 84, or 86 sends the data request to its corresponding data store 92, 94, or 96.

The data store 92, 94, or 96 retrieves the data element requested by COTS application 12 and returns it to its corresponding driver 82, 84, or 86. The driver 82, 84, or 86 then passes the data element to its corresponding wrapper 72, 74, or 76, which then sends the data element to the data access layer 60. The data access layer 60 translates the data element from the format of the data store 92, 94, or 96 from which it was retrieved into the generic format.

The data access layer 60 then sends the data element in the generic format to the appropriate translator, which, in this case, is translator 42 since the data access layer 60 received the original data request from translator 42. Translator 42 translates the data element from the generic format into the format of COTS application 12 and sends the translated data element to listener 32. Listener 32 sends the data element to driver 22, which then passes it on to COTS application 12, thus completing the data request.

Figure 2:
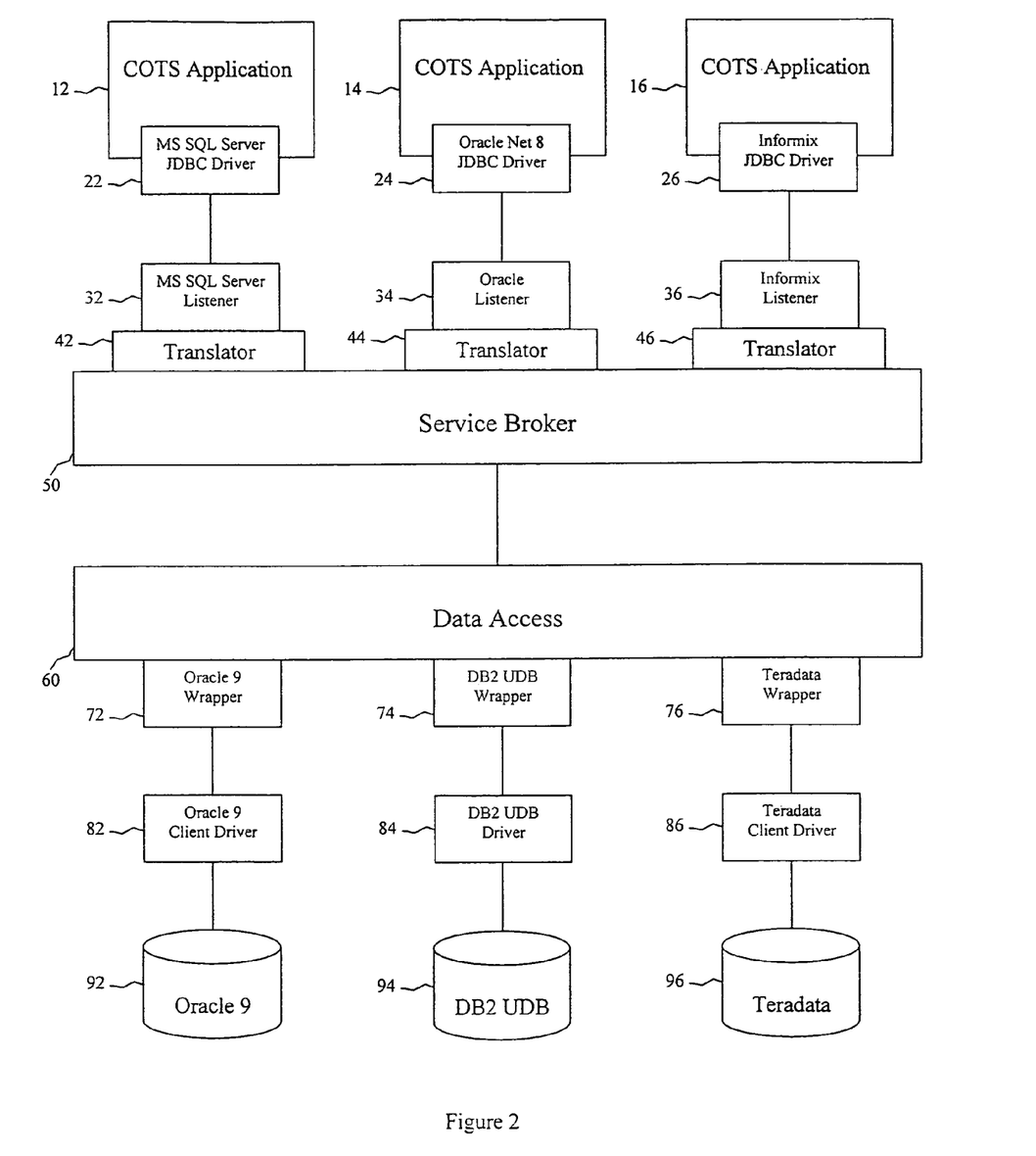
FIG. 2 is a block diagram of an alternative embodiment of a system allowing communication between commercial, off-the-shelf applications and data stores.

FIG. 2 depicts an alternative embodiment of a system through which COTS applications 12, 14, and 16 can communicate with data stores 92, 94, and 96. In this embodiment, a layer that can be referred to as a service broker 50 is interposed between the translators 42, 44, and 46 and the data access layer 60. The service broker 50 has the capability of communicating with computing applications other than the data stores 92, 94, and 96. The configuration of FIG. 2 would typically be used when a COTS application 12, 14, or 16 might generate an operation that requires communication with a data store 92, 94, or 96 as well as with some other application.

In such a case, the translators 42, 44, and 46 would send data requests to the service broker 50 instead of to the data access layer 60. The service broker 50 would send the portions of the request that concern the data stores 92, 94, and 96 to the data access layer 60, which would then handle those portions of the request in the manner described above. The service broker 50 would send the portions of the request that concern other applications to the appropriate applications.

Thus, the data access layer 60 is typically used by itself as shown in FIG. 1 when the data stores 92, 94, and 96 are the only entities that will be affected by an event generated by a COTS application 12, 14, or 16. The embodiment with the service broker 50 shown in FIG. 2 is typically used when additional entities might be affected. An example of one such service broker is described in U.S. patent application Ser. No. 10/619,296 filed Jul. 14, 2003 and entitled "Integration Infrastructure", which is incorporated herein by reference for all purposes.

In the embodiments of both FIG. 1 and FIG. 2, a data request can require that data be retrieved from more than one data store 92, 94, or 96. In either case, the data access layer 60 can retrieve data from as many data stores as necessary, aggregate the data into a single response, and return the response to the requesting COTS application 12, 14, or 16.

Figure 3:
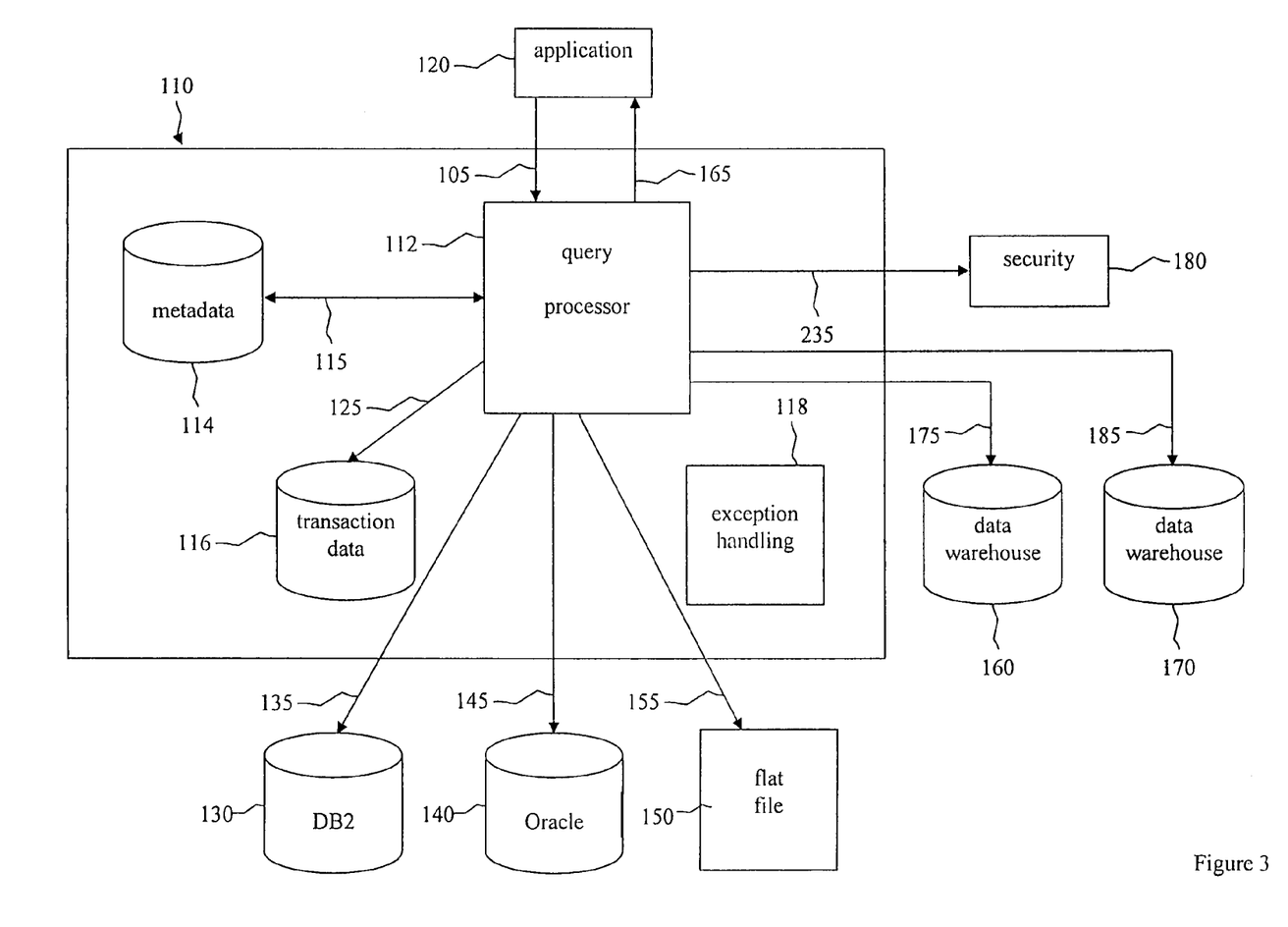
FIG. 3 is a block diagram of an embodiment of a data access layer.

FIG. 3 depicts an embodiment of a system through which transaction processing can be provided to COTS data stores and through which data warehouses can be kept up-to-date. A data access layer 110 handles data transfers among an external application 120, COTS data stores 130, 140, and 150, and data warehouses 160 and 170. In the present embodiment, the external application 120 is a separate application, while in other embodiments, it may not be internal or a part of one or more of the other described systems. The data stores shown in FIG. 3 are a DB2 database 130, an Oracle database 140, and a flat file 150 but other numbers and types of data stores could be present. Similarly, other numbers of data warehouses could be present.

The data access layer 110 comprises a query processor 112, a metadata database 114, a transaction database 116, and an exception handling module 118. The query processor 112 receives data requests from the external application 120. A data request might be a query to retrieve data from a COTS data store 130, 140, or 150, an update to the data in a COTS data store 130, 140, or 150, or some other type of interaction with the data in a COTS data store 130, 140, or 150.

The metadata database 114 informs the query processor 112 how to handle data requests. A logical data model in the metadata database 114 determines which COTS data store 130, 140, or 150 a data request applies to, how the data should be updated, retrieved, aggregated, or otherwise manipulated and whether updated data should be sent to a data warehouse 160 or 170.

If the query processor 112 detects that an error has occurred in the processing of a data request, the query processor 112 informs the exception handling module 118. The exception handling module 118 retrieves the data request from the transaction database 116, determines from the data request the previous state of any data elements that were changed, and rolls the data elements back to their previous state.

FIG. 3 depicts a successful data request. In this embodiment, a data request is made sequentially to the DB2 database 130, the Oracle database 140, and the flat file 150. That is, the data request is first made to the DB2 database 130 and, if it is completed successfully, it is then made to the Oracle database 140. If the data request is completed successfully in the Oracle database 140, it is then made to the flat file 150.

An external application 120 sends the data request to the query processor 112 via path 105. Query processor 112 consults the metadata database 114 via path 115 to determine how the data request should be handled. Query processor 112 also sends a copy of the data request to transaction database 116 via path 125. The logical data model in the metadata database 114 indicates to the query processor 112, via path 115, how to process the data request. The query processor 112 then attempts to perform the appropriate actions on the COTS data stores 130, 140, and 150, via paths 135, 145, and 155, respectively.

In the embodiment of FIG. 3, the data request is completed successfully in all of the COTS data stores 130, 140, and 150. Therefore, the copy of the data request in the transaction database 116 is no longer needed and is removed from the transaction database 116. The data request is then considered committed in the COTS data stores 130, 140, and 150 and the query processor 112 sends a report of a successful data request to the external application 120 via path 165. If the data request was a data update and if the logical data model in the metadata database 114 specifies that the updated data should be sent to the data warehouses 160 and 170, this is then done in a process described below.

The same data element can be maintained in more than one COTS data store 130, 140, and/or 150 and might also be kept in one or more data warehouses 160 and/or 170. For example, a common data element such as a user name might need to exist in multiple locations. If a change is made to such a data element, the change would typically need to take place in all locations that contain the element. For example, the metadata database 114 might tell the query processor 112 that a data request needs to go to the COTS data stores 130, 140, and 150 in that order. When the change is committed in the COTS data stores 130, 140, and 150, the metadata database 114 might specify that the same change needs to occur in one or more data warehouses 160 and/or 170. While data requests to the COTS data stores 130, 140, and 150 are done synchronously, updated data may be sent to the data warehouses 160 and 170 in an asynchronous, publish/subscribe manner.

In publish/subscribe data transfer, a publishing application places a data message on one or more communication channels. The data message typically includes a header that describes the content of the message. Applications that have access to the communication channels can examine the header and determine if the message is relevant to them. If an application is interested in a message, it can accept, or subscribe to, the message. Publish/subscribe messaging is asynchronous in that a publishing application can publish a message at one time and a subscribing application can receive the message at later time.

In the embodiment of FIG. 3, the query processor 112, via paths 165 and 175, publishes any updates that were made to the COTS data stores 130, 140, and/or 150. A data warehouse 160 or 170 can subscribe to the updates, via path 165 or 175, if it is interested. If a data warehouse 160 or 170 subscribes to the updates, the data in the data warehouse 160 or 170 will match the data in the COTS data stores 130, 140, and 150.

In an embodiment, the original data request is not deleted from the transaction database 116 upon the successful updating of COTS data stores 130, 140, and 150 but instead remains in the transaction database 116 until a data warehouse 160 or 170 responds that it has received the updated data. This allows the query processor 112 to retrieve a data request from the transaction database 116 and publish a data update again if an error occurs in the publish/subscribe process.

In this manner, the data warehouses 160 and 170 can replicate the data in the COTS data stores 130, 140, and 150. After the data in the COTS data stores 130, 140, and 150 has been copied to the data warehouses 160 and 170 one time in a batch process, the data warehouses 160 and 170 can stay up-to-date merely by keeping up with changes in the COTS data stores 130, 140, and 150 as they occur. Updating a data warehouse 160 or 170 in this manner keeps the data warehouse 160 or 170 more current than copying data to the data warehouse 160 or 170 in a periodic batch process.

Figure 4:
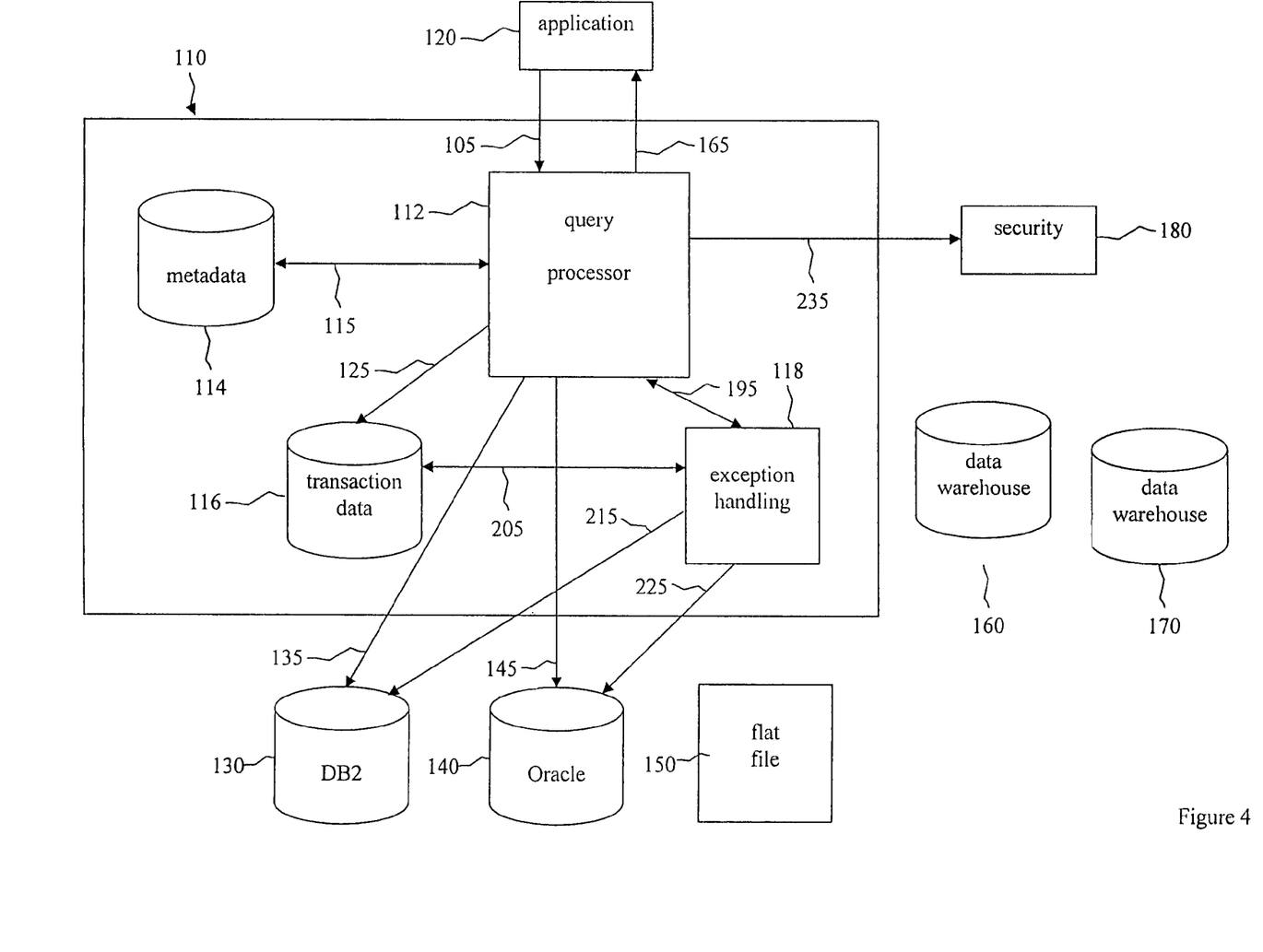
FIG. 4 is a block diagram of an alternative embodiment of a data access layer.

FIG. 4 depicts the processing of a data request in which an error occurs. When an error occurs, the data access layer 110 allows the COTS data stores 130, 140, and 150 to be rolled back to their previous states. In the embodiment of FIG. 4, an external application 120 makes a data request to COTS data stores 130, 140, and 150 sequentially as described above. In this case, however, an error occurs in the processing of the request by the Oracle database 140 after the request is successfully completed in the DB2 database 130. Therefore, the DB2 database 130 and the Oracle database 140 need to be in the status they held prior to the data request.

For the Oracle database 140, the data request was never completed so the Oracle database 140 would remain in its previous state and no rollback of data would be needed. For the DB2 database 130, however, the data request was successfully completed and a rollback would be necessary. The rollback is managed by the exception handling module 118.

When an error occurs and the query processor 112 is unable to complete a data request, the query processor 112 informs the exception handling module 118 of the error via path 185 and specifies the COTS data store 130, 140, or 150 in which the error occurred. The exception handling module 118 then retrieves the record of the data request from the transaction database 116 via path 195. In the embodiment of FIG. 4, the exception handling module 118 retrieves the record of the data request made to the DB2 database 130 and uses it to determine the prior state of the data in the DB2 database 130. Then, via path 205, the exception handling module 118 rolls the data in the DB2 database 130 back to its previous state.

The exception handling module 118 then informs the query processor 112, via path 185, of the actions it took in rolling back the data. The query processor 112 then sends an exception report to the requesting external application 120 via path 225 and removes the copy of the data request from the transaction database 116 via path 125.

In addition to the above functions, the query processor 112 can also perform security functions by calling an external security service 180, via path 235, to determine if the external application 120 is authorized to make a data request. The externalizing of security functions allows the use of a single sign-on for the data access layer 110 and for other applications in an enterprise.

The data access layer provides a form of transaction processing similar to a two-phase commit to commercial, off-the-shelf data stores that do not have that capability. Use of compensating transactions to achieve the two-phase commit capability is an example of an XA compliant transaction, or combinations of both XA compliant transactions and compensating transactions. Various combinations of these and other types of transactions may be employed and may be nested within one another, serially, or otherwise. One embodiment of the present disclosure employs a compensating transaction, which is similar to the two-phase commit, to accomplish a similar result. By using compensating transactions, the present embodiment provides transaction control capabilities to commercial-off-the-shelf (COTS) applications that do not otherwise have this capability. Further, the present disclosure contemplates providing such transaction control to numerous COTS applications integrated within an enterprise, and also in combination with the existing enterprise data stores.

As an example of such transaction or transaction combination, when executing a compensating transaction to update several databases, if the transaction is successful then the non-compliant XA transaction may be executed. If the non-compliant XA transaction is successful, then the XA transaction may be committed and the application may be notified that the transaction was successful. If any of the transactions failed then the transaction may be compensated or rolled-back. In one embodiment, a compensating transaction may be described as the programming code or logic to restore, return, or back-out the recent change(s) or update(s) made to the data store or database. Other techniques and combinations of transactions will readily suggest themselves to one skilled in the art based on the present disclosure.

In some aspects, the data store or database may be operable to roll-back some or all the transaction(s) until the data store is instructed to commit the transaction. In other aspects, the roll-back may be handled by a program so that all or portions of the transaction record is maintained, including the previous state of the data, in order to be operable to restore the data in the event of a failure.

Such transaction processing can be provided to multiple data stores that use disparate data storage protocols and formats. In addition, the data access layer keeps data warehouses more current than they are kept through traditional batch updates. The use of publish/subscribe messaging allows data warehouses to be updated whenever an update to an operational data store occurs.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system for decoupling commercial-off-the-shelf software applications from data stores, the system comprising:
    a plurality of commercial-off-the-shelf software applications each compatible with one of a plurality of first data stores, each of the plurality of commercial-off-the-shelf software applications submits a data request compatible with one of the plurality of first data stores;
    a plurality of second data stores;
    a plurality of drivers, wherein each of the plurality of first data stores and the plurality of second data stores has a corresponding one of the plurality of drivers configured to receive the data request and pass the data request to the corresponding data store;
    one of a plurality of listeners, recorded on a computer readable medium, when executed by at least one processor, simulates a corresponding one of the plurality of drivers corresponding with one of the plurality of first data stores and receives the data request from a corresponding one of the plurality of commercial-off-the-shelf software applications that is compatible with the one of the plurality of first data stores simulated by the one of the plurality of listeners, wherein each of the plurality of commercial-off-the-shelf software applications has a corresponding one of the plurality of listeners;
    a translator, recorded on a computer readable medium, in communication with the one of the plurality of listeners and the plurality of second data stores, the translator, when executed by at least one processor, receives the data request from the one of the plurality of listeners, translates the data request into a generic format to produce a translated data request, and submits the translated data request for one of the plurality of drivers corresponding with one of the plurality of second data stores for storage by the one of the plurality of second data stores; and
    a data access layer, recorded on a computer readable medium, in communication with the translator and, when executed by at least one processor, determines to direct the translated data request from one of the commercial-off-the-shelf software applications that correspond with the one of the plurality of listeners to the one of the plurality of second data stores, and translates the translated data request from the generic format into a storage format of the one of the plurality of second data stores.

2. The system of claim 1, wherein the data access layer maintains an enterprise data model including a data map of where to direct a data request of each of the commercial-off-the-shelf software applications.

3. The system of claim 2, wherein the data access layer receives the translated data request from the translator and directs the translated data request to the one of the plurality of second data stores.

4. The system of claim 1, wherein a first commercial-off-the-shelf software application of the plurality of commercial-off-the-shelf software applications submits a first data request in a first relational database format and wherein the data access layer translates the first data request to a second relational database format.

5. The system of claim 4, wherein a second commercial-off-the-shelf software application of the plurality of commercial-off-the-shelf software applications submits a second data request in an older version of the first relational database format and wherein the data access layer translates the second data request to a newer version of the first relational database format.

6. The system of claim 1, wherein a first commercial-off-the-shelf software application of the plurality of commercial-off-the-shelf software applications submits a first data request in an older version of a first relational database format and wherein the data access layer translates the first data request to a newer version of the first relational database format.

7. The system of claim 1, wherein at least one of the plurality of second data stores corresponds with one of the plurality of first data stores.

8. The system of claim 7, wherein the at least one of the plurality of second data stores is further defined as a newer version data store of one of the plurality of first data stores.

9. The system of claim 8, wherein at least one of the plurality of second data stores is further defined as a newer version of a relational database of a first vendor and wherein one of the plurality of first data stores is further defined as an older version of the relational database of the first vendor.

10. The system of claim 8, wherein at least one of the plurality of second data stores is further defined as a newer version of a relational database of a second vendor and wherein one of the plurality of first data stores is further defined as an older version of the relational database of the second vendor.

11. The system of claim 1, wherein the plurality of commercial-off-the-shelf software applications are each operable with only one of a plurality of data stores, each of the plurality of commercial-off-the-shelf software applications submitting data requests compatible with only one of the plurality of data stores.

12. A system for maintaining compatibility of commercial-off-the-shelf software applications with data stores, the system comprising:
    one of a plurality of commercial-off-the-shelf software applications operable with only one of a plurality of first data stores, the one of the plurality of commercial-off-the-shelf software applications submits a data request compatible with only the one of the plurality of first data stores;

a first of a plurality of drivers configured to receive the data request and pass the data request to the one of the plurality of first data stores;

one of a plurality of listeners, recorded on a computer readable medium, when executed by at least one processor, simulates the first of the plurality of drivers and receives the data request from the one of the plurality of commercial-off-the-shelf software applications submitted for the first of the plurality of drivers, wherein each of the plurality of commercial-off-the-shelf software applications has a corresponding one of the plurality of listeners;

a translator, recorded on the computer readable medium, in communication with the one of the plurality of listeners, when executed by at least one processor, receives the data request from the one of the plurality of listeners and translates the data request into a generic format to produce a first translated data request;

a data access layer, recorded on the computer readable medium, in communication with the translator and, when executed by at least one processor, determines, based on an enterprise data model, to direct the data request of the one of the plurality of commercial-off-the-shelf software applications to one of a plurality of second data stores and translates the first translated data request from the generic format into a storage format of the one of the plurality of second data stores to produce a second translated data request;

a wrapper, recorded on the computer readable medium, when executed by at least one processor, receives the second translated data request from the data access layer and wraps the second translated data request based on the storage format of the one of the plurality of second data stores;

a second driver configured to receive the wrapped second translated data request and pass the wrapped second translated data request to the one of the plurality of second data stores; and the one of the plurality of second data stores receives the wrapped second translated data request from the second driver and performs an action specified in the data request.

13. The system of claim 12, wherein the one of the plurality of second data stores is one of a newer version data store of the one of the plurality of first data stores and a different vendor database than the one of the plurality of first data stores.

14. A system for integration of commercial-off-the-shelf software applications and databases, the system comprising:

a plurality of commercial-off-the-shelf software applications each compatible with one of a plurality of first data stores, one of the plurality of the commercial-off-the-shelf software applications submits a data request compatible with one of the plurality of first data stores;

a first of a plurality of drivers configured to receive the data request and pass the data request to the one of the plurality of first data stores;

at least one processor;

one of a plurality of listeners, recorded on a computer readable medium, when executed by at least one processor, simulates the first of the plurality of drivers and receives the data request from a corresponding one of the plurality of the commercial-off-the-shelf software applications submitted for the first of the plurality of drivers, wherein each of the plurality of commercial-off-the-shelf applications has a corresponding one of the plurality of listeners;

a translator, recorded on a computer readable medium, in communication with the one of the plurality of listeners, when executed by at least one processor, receives the data request from the one of the plurality of listeners and translates the data request into a generic format to produce a translated data request;

a data access layer, recorded on a computer readable medium, in communication with the translator and, when executed by at least one processor, determines, based on an enterprise data model, to direct the translated data request from the one of the plurality of commercial-off-the-shelf software applications that corresponds with the one of the plurality of listeners to one of a plurality of second data stores, and translates the translated data request from the generic format into a storage format of the one of the plurality of second data stores;

a second of the plurality of drivers configured to receive the translated data request and pass the translated data request to the one of the plurality of second data stores, wherein the one of the plurality of second data stores receives the translated data request from the second of the plurality of drivers and performs an action specified in the data request; and a service broker, recorded on the computer readable medium, when executed by at least one processor, maintains a record of data requests from the one of the plurality of commercial-off-the-shelf software applications and stored in the one of the plurality of second data stores, the service broker further configured to roll-back failed data requests.

15. The system of claim 14, wherein the one of the plurality of commercial-off-the-shelf software applications is operable with only the one of the plurality of first data stores, and wherein the one of the plurality of commercial-off-the-shelf software applications submits the data request compatible with only the first data store.

16. The system of claim 14, wherein the service broker further comprises:

a transaction data store configured that maintains a record of the data request by the one of the plurality of commercial-off-the-shelf software applications;

an exception handler that identifies a failed transaction and communicates with the transaction data store to restore the one of the plurality of second data stores to a state prior to the failed transaction.

17. The system of claim 16, further comprising a data warehouse, recorded on the computer readable medium, and wherein the data warehouse, when executed by at least one processor, is asynchronously updated with the data request from the one of the plurality of commercial-off-the-shelf software applications.

18. The system of claim 16, wherein a compensating transaction is used to restore the failed transaction.

19. The system of claim 18, wherein an XA transaction is used in combination with the compensating transaction to restore the failed transaction.

20. The system of claim 16, further comprising:

a data warehouse, recorded on the computer readable medium, when executed by at least one processor, maintains data;

a query processor, recorded on the computer readable medium, when executed by at least one processor, manages transaction processing of data requests from the one of the plurality of commercial-off-the-shelf software applications; and a metadata repository, recorded on the computer readable medium, when executed by at least one processor, maintains a logical data model related to the data, wherein the metadata repository instructs the query processor regarding handling of the data requests from the one of the plurality of commercial-off-the-shelf software applications and between the one of the plurality of second data stores and the data warehouse.

* * * * *

UNITED STATES PATENT AND TRADEMARK OFFICE
CERTIFICATE OF CORRECTION

PATENT NO. : 7,624,376 B1
APPLICATION NO. : 10/820539
DATED : November 24, 2009
INVENTOR(S) : Katzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Twenty-sixth Day of October, 2010

David J. Kappos
*Director of the United States Patent and Trademark Office*